Figure 1:
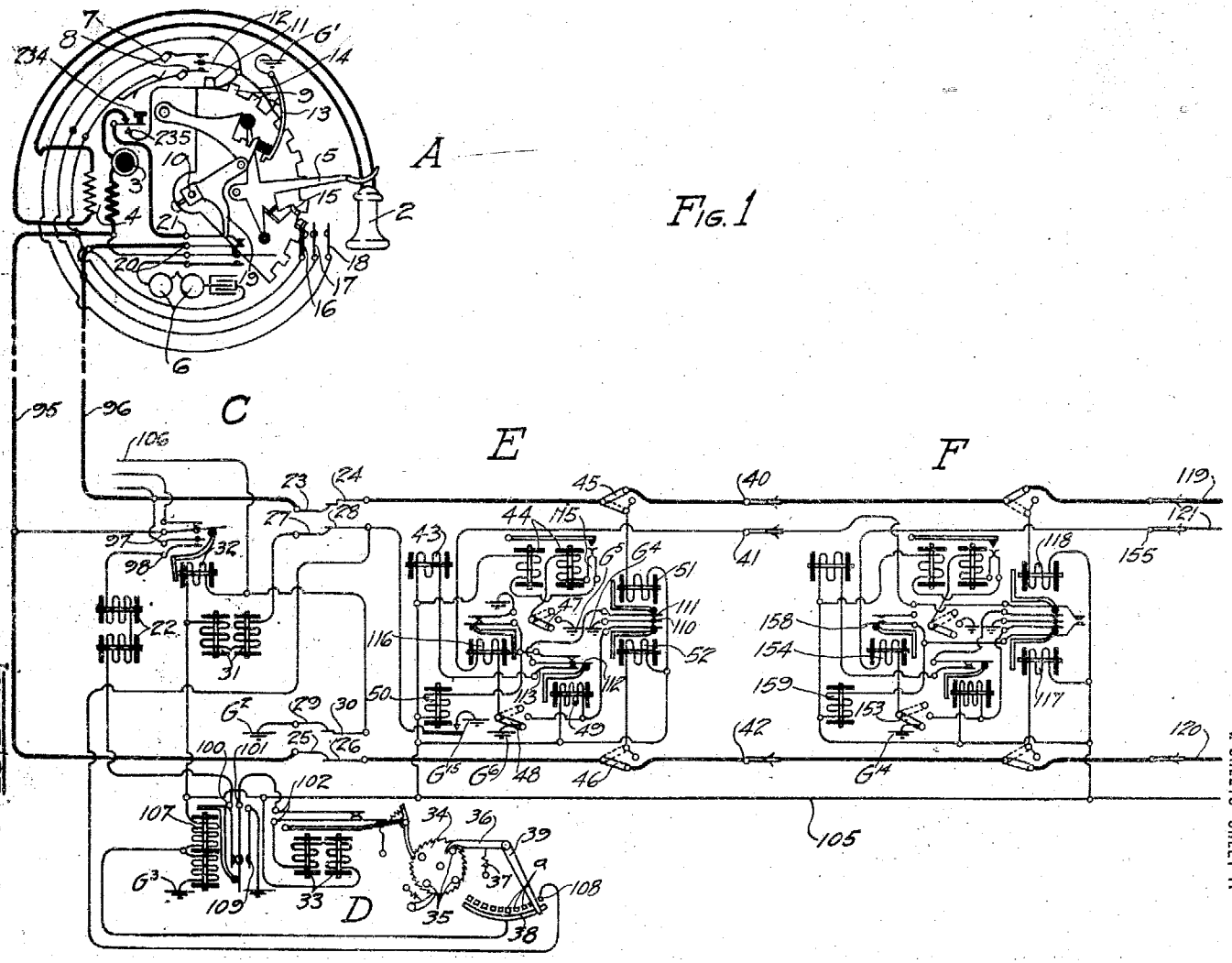

T. G. MARTIN.

CODE RINGING TELEPHONE SYSTEM.

APPLICATION FILED FEB. 24, 1920.

Reissued May 25, 1920. 14,863.

2 SHEETS—SHEET 1.

Inventor
Talbot G. Martin.
Chas. M. Landy.
Atty

T. G. MARTIN.

CODE RINGING TELEPHONE SYSTEM.

APPLICATION FILED FEB. 24, 1920.

Reissued May 25, 1920. 14,863.

2 SHEETS—SHEET 2.

Inventor
Talbot G. Martin.
Chas. M. Landy.
Atty.

UNITED STATES PATENT OFFICE.

TALBOT G. MARTIN, OF CHICAGO, ILLINOIS, ASSIGNOR TO AUTOMATIC ELECTRIC COMPANY, OF CHICAGO, ILLINOIS, A CORPORATION OF ILLINOIS.

CODE-RINGING TELEPHONE SYSTEM.

14,863. Specification of Reissued Letters Patent. Reissued May 25, 1920.

Original No. 1,202,555, dated October 24, 1916, Serial No. 652,781, filed October 4, 1911. Application for reissue filed February 24, 1920. Serial No. 362,031.

*To all whom it may concern:*

Be it known that I, TALBOT G. MARTIN, a citizen of the United States of America, and resident of Chicago, Cook county, Illinois, have invented a certain new and useful Improvement in Code-Ringing Telephone Systems, of which the following is a specification.

My invention relates to telephone systems, and more particularly to improved means for applying ringing current to the called line.

It relates more particularly to means for applying code ringing to a local battery telephone line upon which are located a plurality of subscriber's lines. These lines are what are commonly known as "farmer lines", and are usually manual magneto lines and have a large number of substations. Heretofore when the subscribers have been permitted to call these lines direct, it has been necessary for the calling subscriber to know the particular ringing code of the subscriber desired and to operate his ringing button accordingly.

It is the object of my invention to devise means whereby this code ringing may be done automatically.

I have illustrated my invention in connection with an automatic telephone system in which a series of automatic switches are employed to extend the connection from a common battery calling line to a local battery called line. These lines comprise a plurality of subscribers' stations, and the subscribers are signaled by code ringing. This code ringing is automatically accomplished by providing a set of interrupter wheels for interrupting the circuit of the ringer relay according to the various ringing codes, and by providing an auxiliary device controllable by the calling subscriber for connecting the proper interrupter with the ringing relay. This code selector differs somewhat from the ordinary frequency selector in that the frequency selector may begin to ring as soon as the proper frequency has been selected and the connection completed. In my code selector, however, the ringing cannot be started except at the beginning of the code. If the interrupter happens to be operating when a connection is made, the code selector does not begin to ring the called subscriber until the interrupter has completed the cycle of its operation and is ready to start over again. This is a very important feature of my invention, as otherwise it would not be possible to always obtain the proper operation for code ringing.

These and other objects of my invention will be more readily understood by reference to the accompanying drawings, in which—

Figure 2:
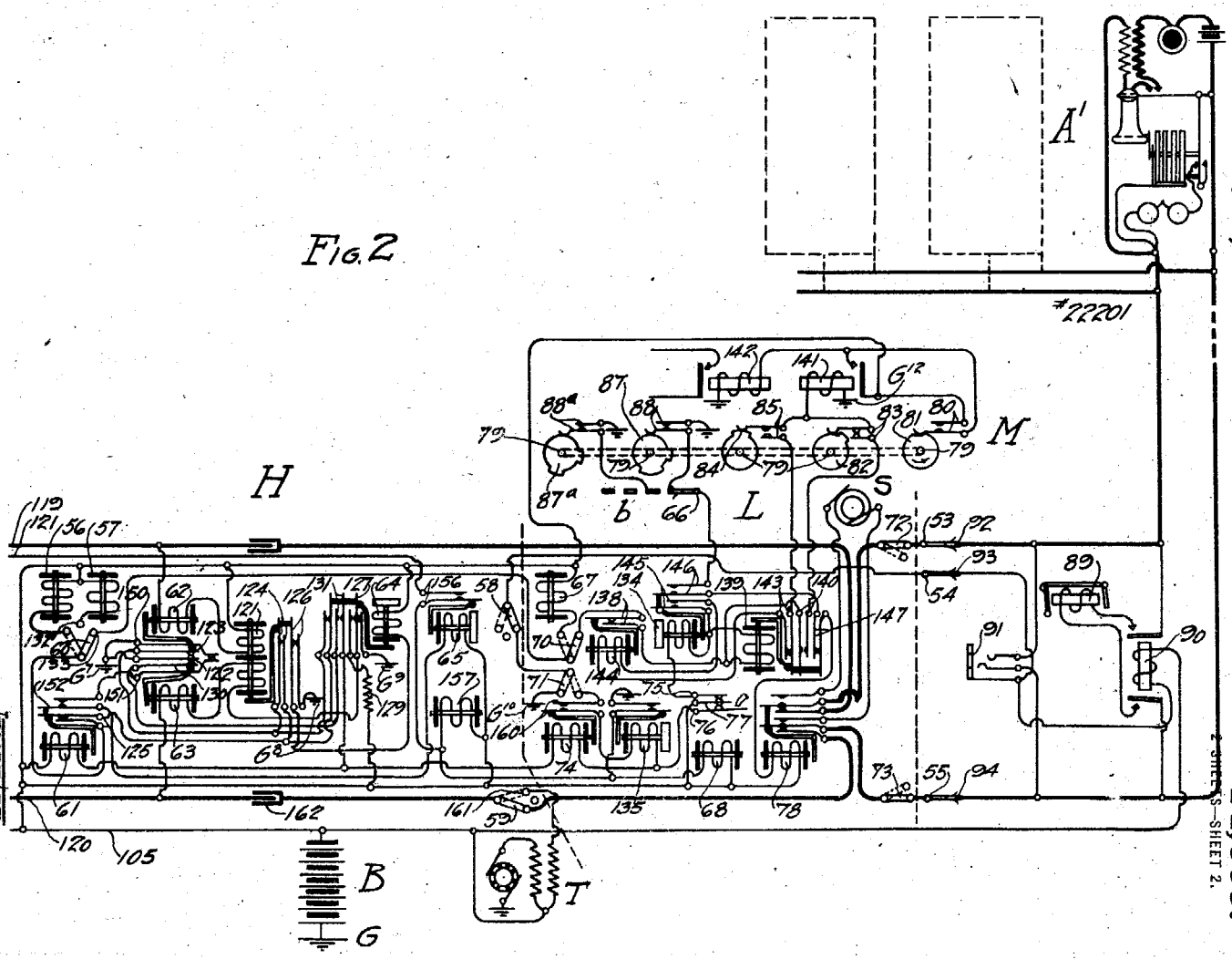

Figures 1 and 2 show a complete connection between a calling automatic substation A (Fig. 1) and a called manual substation A′ (Fig. 2) in a system embodying the principles of my invention.

This connection is established through the medium of a subscriber's individual or line switch C, a first selector E, a second selector F and a connector H. The organization of systems embodying line switches, first and second selectors and connectors is well known and need not be described herein. At M (Fig. 2) is shown an interrupter device and apparatus for controlling the same, which is for the purpose of causing the supply of ringing current to a called polystation line to be interrupted according to a certain predetermined code, so as to cause the substations on the line to be signaled selectively. At L is shown a code selecting device which is for the purpose of selecting the particular combination of interruptions produced by the interrupter M, which interruptions correspond to the ringing code of the particular substation desired.

The automatic substation A may be of any suitable automatic type. As shown herein, the substation is a common battery three-wire automatic substation. By "three-wire substation" is meant one in which means are provided for controlling the automatic apparatus by ground impulses transmitted over the two sides of the line separately. In addition to the usual receiver 2, transmitter 3, induction coil 4, switch hook 5 and ringer 6, the substation A is provided with an automatic calling device of the well-known type comprising the impulse springs 7 and 8 and the toothed impulse wheel 9. The impulse wheel 9 is secured to a shaft 10, to which latter there is also attached a dial (not shown) provided with finger holes. In order to call any digit with this automatic calling device, the finger is inserted in the hole in the dial corresponding to the digit to be called and the dial is rotated around until the finger strikes a suitable stop. The finger is then withdrawn and the dial allowed to return to normal position. As the dial is drawn down, the impulse tooth 11 momentarily forces the spring 8 into contact with the ground spring 12. As the dial returns to its normal position, the teeth on the impulse wheel 9 force the vertical impulse spring 7 into contact with the ground spring 12 a certain number of times, corresponding to the digit called, after which the tooth 11 once more forces the spring 8 into contact with the ground spring 12. The spring 13 is held out of engagement with the spring 14 until after the receiver has been removed from the switch hook and the dial rotated. The arm 15 on the switch hook momentarily forces the springs 16, 17 and 18 into contact as the switch hook descends when the receiver is hung up. The arm 19 permits the springs 20 and 21 to separate whenever the dial is out of normal position, so as to prevent impulses from passing from one side of the line to the other.

The subscriber's individual switch C and the master switch D are of the general type shown and described in British Patent to R. W. James No. 26301 of 1906, and in the *Western Electrician* of Chicago, Illinois, of January 25, 1908. Among the essential details the line switch C comprises a plunger (not shown) which is adapted, when released by the energization of the trip magnet 22, to be forced into a bank of springs 23, 24, 25, 26, 27, 28, 29 and 30, forcing them into contact in pairs as indicated in the drawings. Each line switch is provided with a number of such sets of springs, each set forming a terminal of a trunk line leading to a selector E. The plunger of the line switch is controlled by the master switch D in such manner that when idle it is always maintained opposite an idle trunk line. The plunger of the line switch is restored from its operated to its normal position by the energization and deënergization of the release magnet 31. The cut-off relay 32 is provided for the purpose of disconnecting the switch from the line after it is operated. The master switch D comprises among other details a motor magnet 33 for operating a ratchet wheel 34. The ratchet wheel 34 controls the so-called plunger shaft through the medium of the pins 35 and the arm 36 in such a manner that, as the wheel 34 rotates, the plunger shaft carries the plungers of the idle line switches along in front of their trunk terminals. When the plunger shaft reaches the limit of its motion, the arm 36 slips off one of the pins 35, whereupon the spring 37 draws down the arm 36 until it strikes the next pin 35, thereby restoring the plunger shaft to its normal position, so that during subsequent rotation of the wheel 34 the plungers will again be carried along in front of their bank contacts in the same direction as before. The master switch is provided with a bank of contacts comprising a common segment 38 and one individual contact *a* for each trunk line to which the line switches have access. The wiper 39 keeps the common segment 38 in electrical connection with the individual contact of the trunk line before which the plungers of the idle line switches are resting.

The selector E is of the general type of selectors shown in United States Letters Patent No. 815,321, granted to Keith, Erickson and Erickson March 13, 1906. Among other details the selector comprises a set of wipers 40, 41 and 42 carried upon a shaft (not shown) having a vertical motion controlled by the so-called vertical magnet 43 and a rotary motion controlled by the rotary magnet 44. The usual side switch comprising the wipers 45, 46, 47 and 48 is controlled by the private magnet 49 in a well known manner. Means for restoring the switch to normal position are provided in the usual release magnet 50. The switch is controlled from the calling substation through the medium of the vertical and rotary line relays 51 and 52. The second selector F is essentially the same as the first selector E.

The connector H (Fig. 2) is of the general type of connector switches shown in United States Letters Patent No. 815,175, granted March 13, 1906, to Keith, Erickson and Erickson, and comprises the usual wipers 53, 54 and 55, vertical magnet 56 rotary magnet 57, side switch wipers 58, 59 and 60, private magnet 61 and vertical and rotary line relays 62 and 63. The connector H is particularly adapted to connect a common battery calling line with a local battery called line. The relays 64 and 65 are slow acting relays—that is, relays which deënergize slowly after their energizing circuits have been broken. This slow action may be obtained by securing a ring of copper around one end of the core of the relay. The usual ringing relay is omitted from the connector H and is supplied in the code selector L. The code selector L comprises the apparatus shown between the dotted lines in Fig. 2. The wipers 53, 54 and 55 shown at the right of the selector L belong to the connector H. The selector L comprises a wiper 66 carried upon a rotary shaft and adapted to rotate over and make contact with a bank of contacts *b*. The power for rotating the shaft is furnished by the magnet 67. A release magnet 68 is provided for restoring the shaft to normal position. The release magnet and the rotary magnet may be similar in their operation and construction to the rotary magnet and release magnet of the connector H and as shown in said connector Patent No. 815,176. The selector L is provided with a side switch comprising the wipers 70, 71, 72 and 73, which may be like the side switch of the connector H except that it has only two positions. The side switch is controlled by the private magnet 74 in the same manner as in the selector and connector switches. A plurality of springs 75, 76 and 77 are provided, which springs are permitted to close only after the switch shaft has been rotated one or more steps. The relay 78 performs the same functions as the ordinary ringing relay in the connector switches—that is, when energized it disconnects the calling and the called lines and connects the ringing current generator S with the called line. The code ringing selector L is individual to the connector H, there being one such selector for each connector in the exchange, which selector is adapted to call the local battery poly-station lines.

The interrupter device M comprises a number of interrupter wheels attached to a common shaft 79 which is adapted to be rotated by a suitable motor (not shown). Each interrupter wheel is adapted to control a pair of contact springs. The wheel 81 controls the springs 80 in such manner as to permit them to be separated only when the mechanism is in its normal position. The wheel 82 controls the springs 83 so as to separate them momentarily, just after the wheels leave normal position. The wheel 84 separates the springs 85 just before the wheels reach normal position upon completion of a revolution, but permits them to close after the wheels start again and before the wheel 82 separates the springs 83. The wheels 87 and $87^a$ are code wheels—that is, during their revolution they close contact between the springs 88 and $88^a$, so as to produce combinations of long and short impulses corresponding to the ringing codes of different substations on the poly-station line. These impulses are for controlling the ringing relay of the code selector L, so as to cause the proper impulses of ringing current to flow over the line to signal the desired substation. As shown, the wheel 87 is arranged to produce a short and a long impulse. Although only two code wheels are shown, there would be as many such wheels as there are substations on the manual line, each code wheel being arranged to produce a combination of impulses corresponding to the ringing code of a different substation on the line. The springs controlled by each code wheel are connected to an individual contact *b* in the bank of the code selector L, there being as many such contacts as there are substations on the line. The code wheels are set so that they do not begin to operate their springs until after the shaft has rotated far enough for the wheel 82 to separate the springs 83 and permit them to close again. Of course, it will be understood that the interrupter device may be common to all of the code selectors L in the exchange. If desired, the code wheels 87, $87^a$, etc., may be arranged to repeat their code one or more times during a single revolution.

The line to which the substation A′ belongs is an ordinary poly-station local battery line equipped at the central office with the usual line drop 89, cut-off relay 90 and jack 91. In addition, the line is connected to the contacts 92, 93 and 94 in the banks of a plurality of connectors H, whereby said line is made accessible to the automatic subscribers.

In order to give a clearer understanding of the invention, it will be explained in detail how the subscriber at the automatic substation A may obtain connection with and signal the subscriber at substation A′ on a manual line. It will be assumed that the substation A′ is substation No. 1 on line No. 2220. Therefore, in order to call the substation A′, the automatic subscriber must operate his calling device for the number 22201. As the substation dial is drawn down to call the first digit 2 after the receiver has been removed from the switch hook, the spring 8 is momentarily pressed into contact with the spring 12, whereby an impulse or current is sent from ground G′ through the springs 13 and 14, 12 and 8, rotary line conductor 95, springs 97 and 98, trip magnet 22, springs 100 and 101, springs 102 and magnet 33 to the battery lead 105, and thence through the battery B to ground G. The magnet 33 is not operatively energized over this circuit. The magnet 22, upon energizing, releases the plunger of the line switch, allowing it to be thrust into the bank to close the springs 23—30 into contact in pairs, as shown. The closure of contact between the springs 23 and 24 and 25 and 26 extends the line connection from the calling line to the first selector E.

The closure of contact between the springs 29 and 30 completes a circuit from ground $G^2$ through said springs 29 and 30 and the cut-off relay 32 to the battery lead 105. The relay 32, upon energizing, disconnects the trip magnet 22 from the calling line. The engagement of the bank springs 29 and 30 also extends a guarding potential from ground $G^2$ over the conductor 106 to the private bank contacts of the calling line in the banks of all the connectors which have access to said line. The engagement of the bank springs 27 and 28 of the line switch completes an energizing circuit for the differentially-wound relay 107 of the master switch D. This circuit extends from ground $G^3$ through the lower winding of the relay 107, segment 38, wiper 39, contact 108 (which, it is assumed, corresponds to the trunk line leading to the selector E), bank springs 28 and 27 and magnet 31 to battery. The magnet 31 does not receive sufficient current over this circuit to be operatively energized. The relay 107, however, operates to open the contact between the springs 100 and 101 and to close the contact between the springs 101 and 109, whereby the trip magnets of all the line switches which are controlled by the master switch D are disconnected from battery and an energizing circuit is closed through the motor magnet 33. Since this circuit includes the interrupter springs 102, the motor magnet 33 thereupon begins to operate in a manner similar to that of a buzzer to rotate the wheel 34 step by step to advance the plungers of the idle line switches away from the trunk seized by the switch C toward an idle trunk. If the first trunk after the one seized by the switch C is idle, the wiper 39 breaks the circuit of the relay 107 as soon as it is carried off the contact 108 by the first step of the master switch. The relay 107 thereupon returns to normal position and breaks the circuit of the operating magnet 33. If, however, the next trunk is busy, the energizing circuit of the relay 107 is maintained through the next contact in the master switch bank, and the motor magnet 33 operates to advance the plungers another step. The motor magnet will continue to operate in this manner until the wiper 39 leaves the contact of the last busy trunk, so that the plungers do not come to rest until an idle trunk is reached.

The foregoing operations have taken place while the dial is being rotated by the subscriber for the first digit. As the dial returns to normal position after being released, the spring 7 is forced into engagement with the spring 12 twice momentarily, after which the spring 8 is once more forced into contact with the spring 12. Each time the spring 7 engages the spring 12 a circuit is closed from ground G′ through the springs 13 and 14, springs 12 and 7, vertical line conductor 96, springs 23 and 24, side switch wiper 45 and vertical line relay 51 of the selector E to the battery lead 105. The relay 51, upon energizing, completes a circuit from ground $G^4$ through the springs 110 and 111, 112 and 113, and the vertical magnet 43 to the battery lead 105. Since two impulses are delivered to the vertical relay 51, the vertical magnet also receives two impulses and operates in response thereto to raise the switch shaft and wipers two steps. The final engagement of the spring 8 with the spring 12 at the substation causes a single impulse to be transmitted from ground G′ through the springs 13 and 14, 12 and 8, rotary line 95, springs 25 and 26, side switch wiper 46 and selector rotary line relay 52 to the battery lead 105. The relay 52, upon energizing, closes a circuit from ground $G^4$ through the private magnet 49. The private magnet, upon energizing and deenergizing, permits the side switch to pass from first to second position. The side switch wiper 47, upon reaching second position, completes a circuit from ground $G^5$ through said wiper 47, rotary magnet 44 and interrupter springs 115 to battery. The rotary magnet thereupon begins to operate in a manner similar to that of a buzzer to rotate the wipers 40, 41 and 42 over the contacts in the second row or level of the selector bank. The rotary magnet continues to advance the wipers step by step as long as the side switch remains in second position. If the first trunk line in the second level is idle, the side switch will be stepped from second to third position by the first operation of the rotary magnet. This is accomplished by a finger on the armature of the rotary magnet which presses down the armature of the private magnet when the rotary magnet is energized. If the first trunk is busy, however, the side switch is not tripped to third position upon the first energization of the rotary magnet, because the private bank contact of said busy trunk will be provided with a guarding potential, and as soon as the wiper 41 engages the said contact a circuit is closed from this guarded contact through the wiper 41, relay 116, side switch wiper 48 (in second position) and private magnet 49 to battery. The armature of the private magnet, therefore, remains held up after the rotary magnet deënergizes and locks the side switch in second position.

The relay 116, which is included in the locking circuit of the private magnet, is not operatively energized, due to the comparatively high resistance of the magnet 49. The side switch being locked in second position, the rotary magnet will continue to advance the wipers step by step until the private wiper 41 passes off the last guarded contact, whereupon the private magnet 49 deënergizes and permits the side switch to pass to third position, thereby breaking the circuit of the rotary magnet and allowing the wipers 40, 41 and 42 to come to rest upon the contacts of an idle trunk. The engagement of the side switch wipers 45 and 46 with their third-position contact points extends the line connection through the selector E to the second selector F. The side switch wiper 48, upon reaching third position, extends a guarding potential from ground $G^6$ through the wiper 48, relay 116 and private wiper 41 to all the first selector private bank contacts of the trunk line leading to the second selector E, which guarding potential is for the purpose of preventing any other first selector from obtaining connection with this trunk line while it is in use.

The apparatus is now in readiness to receive the impulses for the second digit 2 of the number to be called. As the dial is drawn down to call this digit, an impulse is sent over the rotary line 95 and through the rotary line relay 117 of the second selector F. This preliminary rotary impulse for the second digit, as well as for all succeeding digits, is without function, however, because in the switches of the type shown herein the side switch cannot leave first position until after the vertical magnet has been energized once and it cannot leave second position until after the switch shaft has been rotated one or more steps. As the dial returns to normal position for the second digit, two ground impulses are sent over the vertical line 96, followed by one impulse over the rotary line 95. These impulses energize the vertical and rotary line relays, respectively, of the second selector F, causing said second selector to operate in exactly the same manner as explained for the first selector E to extend a connection over the conductors 119 and 120 to an idle connector H (Fig. 2).

The connector H operates in response to the impulses for the next two digits to extend the connection to the called line. As the substation dial returns to normal position for the third digit 2, the vertical line is again grounded twice, after which one impulse is sent over the rotary line 95. The vertical impulses for this digit pass from the vertical line 96 through the selectors E and F through the vertical line relay 62 of the connector and the upper winding of the relay 121 to battery. The relays 62 and 121, upon energizing, complete a circuit from ground $G^7$ through the springs 122 and 123, springs 124, private magnet springs 125, side switch wiper 60 and vertical magnet 56 to battery. The digit called being 2, the vertical magnet receives two impulses over this circuit and operates to raise the switch shaft and wipers two steps. The energization of the relay 121 by the vertical impulses also completes a circuit extending from ground $G^8$ through the springs 126 and the slow acting relay 64 to battery. The relay 64 upon energizing, by shifting the spring 127 out of engagement with its back contact and into engagement with its front contact, disconnects the rotary side of the line from ground $G^9$ and connects it with the battery lead through the resistance 129. The relay 64 being slow acting, remains energized for an instant after the last vertical impulse is delivered, and, therefore, when the impulse over the rotary line is sent in, it finds a path to battery through the rotary relay 63 of the connector, lower winding of the relay 121, spring 127 and its front contact and resistance 129 to the battery lead 105. The relay 121, upon energizing, sends another impulse through the relay 64. The relay 63 upon energizing, completes a circuit from ground $G^7$ through the springs 122 and 130, springs 131 and private magnet 61 to battery. The private magnet, upon energizing and deënergizing, causes the side switch to pass from first to second position. When the substation calling device is operated for the fourth digit 0, ten impulses are transmitted over the vertical line, followed by one impulse over the rotary line. The relays 62 and 121, upon energizing in response to the impulses for this digit, operates to complete the circuit of the rotary magnet 57 instead of the vertical magnet 56 as before, because the side switch wiper 60 is now in engagement with its second-position contact point 132. The rotary relay 63, upon energizing, completes the circuit of the private magnet in the same manner as before, thereby causing the side switch to pass from second to third position. The operations of the rotary magnet in response to the impulses for the fourth digit rotates the wipers 53, 54 and 55 onto the contacts 92, 93 and 94 of the desired line No. 2220.

It now remains to operate the code selector L to select the proper code wheel on the interrupter M to send the proper impulses of current out over the selected line to ring the particular substation wanted. It has been assumed that the desired substation A′ is the substation whose ringing code corresponds to the impulses produced by the wheel 87, the springs 88 of which wheel are connected with the first contact in the bank of the code selector L. Therefore, in order to signal the substation A′ the calling subscriber must operate his calling device again for the digit 1, thereby sending a single impulse over the vertical line, followed by an impulse over the rotary line. This vertical impulse energizes the connector relays 62 and 121 in the same manner as explained for the two preceding digits, but since the side switch of the connector is now in third position, the energization of these relays now completes a circuit from ground $G^7$ to the side switch wiper 60, as previously traced, thence through the contact 133, side switch wiper 70 of the code selector L and operating magnet 67 to battery. Since only one impulse is delivered over this circuit, the magnet 67 energized once, advancing the wiper 66 onto the first contact. As soon as the shaft is rotated this first step, the springs 77, 76 and 75 are permitted to come into contact, whereby the battery is connected with the relays 134 and 135, private magnet 74 and release magnet 68. When the rotary line relay 63 of the connector H energizes in response to the final rotary impulse of the last digit, a circuit is closed from ground $G^7$ through the springs 122 and 130, springs 131, private magnet 74 of the code selector, springs 77 and 76 to battery. The magnet 74 upon energizing and deënergizing, causes the side switch of the code selector to pass to second position. Of course, the private magnet 61 of the connector H will be energized by the final rotary impulse, but this has no effect, since the side switch of the connector has already reached the limit of its travel. The side switch wipers 72 and 73 of the code selector, upon reaching the second position, finally complete the connection between the calling and the called lines. The side switch wiper 71, upon reaching its second position, completes the circuit from ground $G^{10}$ through the wipers 71, 58, and 54 and the cut-off relay 90 of the called line. The relay 90, upon energizing, disconnects the drop 89 from the line. A guarding potential is also supplied from ground $G^{10}$ over the circuit just traced to the connector private bank 93 and the test ring of the jack 91 to protect the called line from being again seized either automatically or manually. In order to finally signal the called subscriber the calling subscriber must press the ringing button 234, whereby a circuit is closed from ground G′ through the springs 13 and 14, 235 and 234, springs 21 and 20, vertical line 96, thence to and through the relays 62 and 121 of the connector H to battery. The relays 62 and 121, upon energizing, complete a circuit from ground $G^7$ through the side switch wiper 70 of the code selector L over a circuit which has been already traced, thence through the second-position contact point of said wiper, springs 138, relay 139, relay 134 and springs 75 and 76 to battery. The relay 139, upon energizing, completes a circuit which forms a locking circuit for itself and the relay 134 and causes the relay 141 of the interrupter M to energize when the ringing button at the substation is released. This circuit extends from ground $G^{12}$ through the relay 141 of the interrupter device M, springs 83 and 140 and the relays 139 and 134 to battery.

The relay 141, upon energizing, closes the circuit of the relay 142, which operates to close the circuit of the motor which rotates the shaft 79. After the shaft is rotated a short distance, the wheel 82 separates the springs 83, thereby breaking the locking circuit of the relays 139 and 134. The relay 134, being slow acting, does not deënergize immediately, but the relay 139, being quick acting, deënergizes immediately and closes a new locking circuit for the relay 134. This circuit extends from ground G′ through the relay 141, springs 85 and 143, relay 144, springs 145 and relay 134 to battery. The relay 134 therefore remains energized when the relay 139 deënergizes, while at the same time the relay 144 energizes to separate the springs 138, so that the calling subscriber cannot interfere with the operations by again pressing the signaling button. The relay 134 being energized and the relay 139 being deënergized, the circuit is completed from the lower spring of the pair 88 controlled by the code wheel 87, wiper 66 springs 146 and 147 and ringing relay 78 to battery. During its revolution the wheel 87 closes the contacts between the springs 88 twice, thereby twice closing the circuit of the ringing relay 78 for a predetermined period. Each time the ringing relay energizes it disconnects the calling line from the called line and connects the ringing generator S with the called line. Since two impulses are sent through the ringing relay, two corresponding impulses of ringing current will be sent out over the called line. This will, of course, ring all the bells on the line, but since each substation has a different signal, only the subscriber at the desired substation A′ will answer. After all the code wheels have operated their springs for the last time, and before the wheels finally reach normal position, the wheel 84 separates the springs 85, thereby breaking the locking circuit of the relays 144 and 134. The interrupter device will come to rest when the wheel 81 reaches normal position and allows the springs 80 to separate, thereby opening the circuit of the magnet 142 which controls the motor circuit.

From the above description of the operation of the code selector L, it will be seen that the circuit from the ringing relay to the springs of the code wheel is not closed immediately upon the operation of the ringing button at the calling substation, but the apparatus is placed in a condition whereby said circuit will be closed as soon as the wheel 82 separates the springs 83. Thus, it will be seen that if the interrupter is being used by some other subscriber at the time the subscriber at substation A presses his ringing button, the ringing relay 78 will not begin to be operated until after the code wheels have completed their revolution and are ready to start over again. It will be evident that if the circuit of the ringing relay were closed through to the springs of the code wheel as soon as the ringing push button were pressed, and if the interrupter device were already operating, the code wheels might be partway around, and the ringing relay would loose one or more of its impulses, thereby giving the wrong signal. With the arrangement shown herein, the code wheels cannot begin to send impulses to the ringing relay except at the beginning of the code.

During the conversation the local battery substation of course receives talking current from its own local battery. The common battery automatic substation receives talking current from the central office battery B over a circuit which extends from ground $G^9$ at the connector H through the spring 127, lower winding of the relay 121, rotary relay 63, thence to and through the calling substation and back over the other side of the line through the vertical relay 62 of the connector and upper winding of the relay 121 to battery. The relay 121, being differential, is not energized by this talking current, while the energization of the relays 62 and 63 is functionless.

After the conversation is finished the connection is released by the hanging up of the receiver at the calling substation. As the switch hook descends, the springs 16, 17 and 18 are momentarily forced into contact, thereby grounding both the vertical and rotary line conductors 96 and 95. The grounding of the line unbalances the relay 121, causing it to be energized. The relay 121, upon energizing, closes the circuit of the relay 64 in the usual manner. The relay 64, upon energizing, shifts the connection of the lower winding of the relay 121 from the grounded to the non-grounded terminal of the battery, whereupon the rotary line relay 63 becomes energized, owing to the fact that the rotary line 95 is grounded at the substation release springs. The relays 64 and 63, upon energizing, close the circuit of the private magnet 61 in the same manner as has been previously explained. The combined energization of the relays 62 and 63 and the private magnet 61 completes a circuit from ground $G^7$ through the springs 150 and 151, springs 152 and relay 65 to the battery lead 105. The relay 65, upon energizing, completes a circuit extending from ground $G^{14}$ at the selector F (Fig. 1) through the side switch wiper 153, relay 154, private wiper 155, release trunk conductor 121, springs 156, thence through the release magnets 157 and 68 of the switches H and L in multiple to the battery lead 105. The magnets 157 and 68 of the switches H and L immediately restore the wipers and the side switches of their respective switches to normal position. The relay 154 of the selector F, upon energizing, completes a circuit extending from ground $G^6$ at the selector E through the side switch wiper 48, relay 116, private wiper 41, springs 158 and release magnet 159 of the selector F to the battery lead 105. The relay 116 of the selector E, upon energizing, closes the circuit of the release magnet 50. The release magnet 50, upon energizing, closes a circuit from ground $G^{15}$ to and through the release magnet 31 of the line switch C to battery. The release magnets 159, 50 and 31 attract their armatures and hold them in readiness to release their respective switches when the magnets are deënergized. The substation release springs separate and remove the ground from the line conductors 95 and 96 just before the switch hook reaches the limit of its downward motion. The relays 62, 63 and 121 of the connector thereupon deënergize and break the circuit of the slow acting relay 65. This relay deënergizes after a short time and breaks the circuit of the release magnets 68 and 157 and of the release relay 154 of the selector F. This relay thereupon deënergizes and breaks the circuit of its own release magnet 159 and of the relay 116 of the selector E. The relay 116, upon deënergizing, breaks the circuit of the release magnet 50, which in turn breaks the circuit of the magnet 31 of the switch C, whereupon the switches F, E and C are all restored to normal position. The relay 65 of the connector H is slow acting, so as to maintain the release magnet 68 of the code selector L energized long enough to permit the wipers to be fully restored to normal position before said magnet is deënergized.

In the foregoing description it was assumed that the called line was idle. If the called line had been busy, the connector H and the code selector L would not have completed connection therewith, and the calling subscriber would have been given the busy signal in the following manner: As has been explained, whenever a line is in use there is a guarding ground potential from the connector private bank contacts of said line. Therefore, if the called line is busy, the private wiper 54 of the connector will be resting upon a grounded contact at the time when the last rotary impulse is delivered to the connector. As has been explained, this last rotary impulse causes the energization of the private magnet 74 of the code selector L. If the wiper 54 is standing upon the grounded contact at this time, a circuit will be closed from said grounded contact through said wiper, through the side switch wiper 58 of the connector (in third position), side switch wiper 71 of the code selector L (in first position), springs 160, relay 135 and the springs 77 and 76 to battery. The relay 135, upon energizing, closes the circuit of the release magnets 68 and 157 of the switches L and H, and maintains them closed long enough to give the wipers of the code selector L sufficient time to return to normal position. The connector H being released, the side switch wiper 59 will be in contact with its first-position contact point 161, thereby connecting the busy signaling machine T with the calling line to give the calling subscriber the busy signal. The circuit over which the busy signaling current flows extends from one terminal of the machine T through the side switch wiper 59 condenser 162, thence over the heavy conductors to and through the calling substation and back over the other side of the line, through the relays 62 and 121 of the connector to the battery lead 105, and thence to the other terminal of the busy signaling machine.

While I have illustrated my invention in connection with an automatic telephone system of well-known type, it is to be understood that my invention is not limited to such use, but my improved means for automatically applying code ringing to the subscribers' lines is capable of use in telephone systems broadly, and I do not desire to limit myself to any particular type of system.

What I claim as my invention is:—

1. In a telephone system, a party line, a plurality of substations on said line, a plurality of switching devices each of which is operable to automatically predetermine a code signal, mechanism common to said switching devices for signaling said stations according to the predetermined code, and automatic means to insure that the code is always applied to the line at the beginning.

2. In a telephone system, party lines, a plurality of signals on each of said lines at the substations, a source of ringing current, a plurality of switching devices each operable to connect said source with any one of said lines, whereby a plurality of said lines may be signaled at the same time, a common mechanism for controlling the application of said source of connected lines in accordance with predetermined codes, and automatic means to insure that the said source is applied to each line at the beginning of the code.

3. In a telephone system, a party-line, a plurality of signals on said line, a source of ringing current, a relay for connecting said ringing current with the line, and a plurality of interrupters for controlling said relay according to a predetermined code.

4. In a telephone system, a party-line, a source of ringing current, a relay for connecting said source with said line, a plurality of interrupters for controlling the relay according to a predetermined code, and a step-by-step-operated device for connecting the relay with any desired interrupter.

5. In a telephone system, a party-line, a plurality of signals on said line, automatically-controlled means for operating said signals according to a predetermined code, and means for rendering said operating means inoperative except at the beginning of the code series.

6. In a telephone system, a party-line, a plurality of signals on said line, a source of ringing current, means including a plurality of interrupters for connecting said source of current to the line so as to operate said signals according to a predetermined code, and means for rendering said connecting means inoperative except at the beginning of the code series.

7. In a telephone system, a party-line, a plurality of signals on said line, a source of ringing current, a relay for connecting said ringing current with the line, a plurality of interrupters for controlling said relay according to a predetermined code, and means for rendering said relay inoperative for connecting said current with the line except when said interrupters are at the beginning of the code series.

8. In a telephone system, a party-line, a source of ringing current, a relay for connecting said source with said line, a plurality of interrupters for controlling said relay according to a predetermined code, a step-by-step-operated device for connecting said relay with any desired interrupter, and means for rendering said relay inoperative for connecting said source with the line except when said interrupters are at the beginning of the code series.

9. In a telephone system, party lines, a plurality of substations on each line, a common code ringing machine, a plurality of devices each operable by a calling subscriber to predetermine a code signal, means controlled by the calling subscriber for signaling a desired station according to the selected code, and automatic means to insure that the signaling operation is started at the beginning of the code.

10. In a telephone exchange system, party lines, a plurality of signals on each line at the substations, a source of ringing current, means at the central station under the control of a calling subscriber for connecting said ringing current source with a desired line so as to operate the signals thereon according to a predetermined code, a common code ringing machine adapted to cooperate in a plurality of such signaling operations simultaneously, and automatic means to insure that each signaling operation is started at the beginning of the code in use.

11. In a telephone system, a partly-line, a plurality of signals on said line, a source of ringing current, a relay for connecting said ringing current with the line, a plurality of interrupters for controlling said relay according to a predetermined code, and means under the control of the calling subscriber for controlling said connection of the ringing current with the line.

12. In a telephone system, a party-line, a source of ringing current, a relay for connecting said source with said line, a plurality of interrupters for controlling the relay according to a predetermined code, and a step-by-step-operated device under the control of the calling subscriber for connecting the relay with any desired interrupter.

13. In a telephone system, a party-line, a plurality of substations on said line, means under the control of the calling subscriber for automatically signaling said stations according to a predetermined code, and means for rendering said signaling means inoperative except at the beginning of the code series.

14. In a telephone system, a party-line, a plurality of signals on said line at the substations, a source of ringing current, means under the control of the calling subscriber for connecting said ringing current with the line so as to operate said signals according to a predetermined code, and means for rendering said connecting means inoperative except at the beginning of the code series.

15. In a telephone system, a party-line, a plurality of signals on said line, a source of ringing current, a relay for connecting said ringing current with the line, a plurality of interrupters for controlling said relay according to a predetermined code, means under the control of the calling subscriber for controlling said connection of the ringing current with the line, and means for rendering said relay inoperative for connecting said ringing current with the line except when said interrupters are at the beginning of the code series.

16. In a telephone system, a party line, a source of ringing current, a relay for connecting said source with said line, a plurality of interrupters for controlling the relay according to a predetermined code, a step-by-step-operated device under the control of the calling subscriber for connecting the relay with any desired interrupter, and means for rendering said relay inoperative for connecting said ringing current with the line except when said interrupters are at the beginning of the code series.

17. In a telephone system, a party line, a plurality of substations on said line, a plurality of automatic switches, means for operating any one of said switches for extending a connection to said line, means common to said switches for automatically signaling said substations on said line according to a predetermined code, and automatic means to insure that the code is always applied to the line at the beginning.

18. In a telephone system, a party line, a plurality of signals on said line at the substations, a plurality of automatic connector switches, means for operating any one of said switches to complete a connection to said line, a source of ringing current, automatically controlled means common to said switches for connecting said current source with the line so as to operate said signals according to a predetermined code, and automatic means to insure that the code is always applied to the line at the beginning.

19. In a telephone system, a party-line, a plurality of signals on said line, means including one or more automatic switches for extending a connection to said line, a source of ringing current, a relay for connecting said ringing current with said line, and a plurality of interrupters for controlling said relay according to a predetermined code.

20. In a telephone system, a party-line, means including one or more automatic switches for extending a connection to said line, a source of ringing current, a relay for connecting said source with said line, a plurality of interrupters for controlling the relay according to a predetermined code, and a step-by-step-operated device for connecting the relay with any desired interrupter.

21. In a telephone system, a party line, a plurality of signals on said line, means including one or more automatic switches for extending a connection to said line, automatically-controlled means for operating said signals according to a predetermined code, and means for rendering said operating means inoperative except at the beginning of the code series.

22. In a telephone system, a party-line, a plurality of signals on said line, means including one or more automatic switches for extending a connection to said line, a source of ringing current, means including a plurality of interrupters for connecting said source of current to the line so as to operate said signals according to a predetermined code, and means for rendering said connecting means inoperative except at the beginning of the code series.

23. In a telephone system, a party-line, a plurality of signals on said line, means including one or more automatic switches for extending a connection to said line, a source of ringing current, a relay for connecting said ringing-current with the line, a plurality of interrupters for controlling said relay according to a predetermined code, and means for rendering said relay inoperative for connecting said current with the line except when said interrupters are at the beginning of the code series.

24. In a telephone system, a party-line, means including one or more automatic switches for extending a connection to said line, a source of ringing current, a relay for connecting said source with said line, a plurality of interrupters for controlling said relay according to a predetermined code, a step-by-step-operated device for connecting said relay with any desired interrupter, and means for rendering said relay inoperative for connecting said source with the line except when said interrupters are at the beginning of the code series.

25. In a telephone system, a party-line, a plurality of substations on said line, means including one or more automatic switches for extending a connection to said line, means under the control of the calling subscriber for automatically signaling said stations according to a predetermined code, a machine common to the exchange for producing the code signals, and automatic means to insure that the code is always applied to the line at the beginning.

26. In a telephone system, a party-line, a plurality of signals on said line at the substations, means including one or more automatic switches for extending a connection to said line, a source of ringing current, means under the control of the calling subscriber for connecting said ringing current with the line so as to operate said signals according to a predetermined code, a machine common to the exchange for producing the code signals, and automatic means to insure that the code is always applied to the line at the beginning.

27. In a telephone system, a party-line, a plurality of signals on said line, means including one or more automatic switches for extending a connection to said line, a source of ringing current, a relay for connecting said ringing current with the line, a plurality of interrupters for controlling said relay according to a predetermined code, and means under the control of the calling subscriber for controlling said connection of the ringing current with the line.

28. In a telephone system, a party-line, means including one or more automatic switches for extending a connection to said line, a source of ringing current, a relay for connecting said source with said line, a plurality of interrupters for controlling the relay according to a predetermined code, and a step-by-step-operated device under the control of the calling subscriber for connecting the relay with any desired interrupter.

29. In a telephone system, a party-line, a plurality of substations on said line, means including one or more automatic switches for extending a connection to said line, means under the control of the calling subscriber for automatically signaling said stations according to a predetermined code, and means for rendering said operating means inoperative except at the beginning of the code series.

30. In a telephone system, a party-line, a plurality of signals on said line at the substations, means including one or more automatic switches for extending a connection to said line, a source of ringing current, means under the control of the calling subscriber for connecting said ringing current with the line so as to operate said signals according to a predetermined code, and means for rendering said connecting means inoperative except at the beginning of the code series.

31. In a telephone system, a party-line, a plurality of signals on said line, means including one or more automatic switches for extending a connection to said line, a source of ringing current, a relay for connecting said ringing current with the line, a plurality of interrupters for controlling said relay according to a predetermined code, means under the control of the calling subscriber for controlling said connection of the ringing current with the line, and means for rendering said relay inoperative for connecting said ringing current with the line except when said interrupters are at the beginning of the code series.

32. In a telephone system, a party-line, means including one or more automatic switches for extending a connection to said line, a source of ringing current, a relay for connecting said source with said line, a plurality of interrupters for controlling the relay according to a predetermined code, a step-by-step-operated device under the control of the calling subscriber for connecting the relay with any desired interrupter, and means for rendering said relay inoperative for connecting said ringing current with the line except when said interrupters are at the beginning of the code series.

33. In a telephone system, a party-line, a plurality of signals on said line, means for operating said signals according to a predetermined code, said means including a step-by-step selector switch, a side switch for said selector switch, and means for controlling said side switch.

34. In a telephone system, a party-line, a source of ringing current, means for connecting said ringing current with said line, a plurality of interrupters adapted to control the application of said ringing current to the line according to predetermined codes, a step-by-step switch for selecting one of said interrupters, another interrupter, and means controlled by said last-mentioned interrupter for preventing connection of said ringing current with the line except when said first mentioned interrupters are at the beginning of a code series.

35. In a telephone system, a plurality of subscribers' lines, a group of automatic connector switches having access to said lines, calling devices for controlling said connectors to connect with desired called lines, a source of ringing current, an auxiliary step-by-step switch individual to each of said connectors and also subject to calling device control, a common mechanism accessible to said auxiliary switches for automatically applying ringing current to called lines according to predetermined codes, and automatic means to insure that each code is always applied to a called line at the beginning.

36. In a telephone system, means including one or more automatic switches for extending a connection from a calling to a called subscriber's line, a calling device for controlling the operation of said switches, a source of ringing current, a series of interrupters, a step-by-step switch under the control of said calling device for selecting one of said interrupters to control the application of ringing current to the line according to a predetermined code, means under the control of the calling subscriber for connecting said ringing current with the line, a second called line and means for applying code signaling currents thereto under control of the same interrupter, and automatic means to insure that the code is always applied to each line at the beginning.

37. In a telephone system, a line, a plurality of signals associated with said line, a plurality of different code senders for operating said signals, a plurality of electrically controlled mechanisms each of which is operable for selecting any one of said code senders for applying it to the said line to send the code signal thereover to operate said signals, and automatic means for controlling the senders to insure that each code signal always begins at the beginning.

38. In a telephone system, a plurality of lines, a plurality of signals associated with each of said lines, a device comprising a plurality of code senders for operating said signals, a plurality of electrically controlled means for selecting any one of said lines, each such means including a device for selecting any one of said senders for applying the sender to the selected line to send a code signal thereover to operate the signals on said line, and automatic means for controlling the senders to insure that each code always begins at the beginning.

39. In a telephone system, party lines, a plurality of connector switches for completing connections to said lines, a code signaling machine common to said switches for signaling any desired station on a connected line according to a predetermined code, and automatic means for insuring that the code signal is always delivered to the line from the beginning.

40. In a telephone system, party lines, a plurality of stations on each of said lines, a source of ringing current, a code ringing machine, a plurality of switching devices each of which is operable for connecting said machine with any desired line to signal a desired station thereon according to a predetermined code, and automatic means for insuring that the code is delivered to the line from the beginning.

41. In a telephone system, a party line, a plurality of signals on said line, automatically controlled means for operating said signals according to a predetermined code, and automatic means for rendering said operating means inoperative except at the beginning of the code series.

42. In a telephone system, a party line, a plurality of signals on said line, a source of ringing current, electrically controlled means including a plurality of interrupters for connecting said source of current to the line so as to operate said signals according to a predetermined code, and automatic means for rendering said connecting means inoperative except at the beginning of the code series.

43. In a telephone system, a party-line, a plurality of signals on said line, a source of ringing current, a relay for connecting said ringing current with the line, a plurality of interrupters for controlling said relay according to a predetermined code, and automatic means for rendering said relay inoperative for connecting said current with the line except when said interrupters are at the beginning of the code series.

44. In a telephone system, a party-line, a source of ringing current, a relay for connecting said source with said line, a plurality of interrupters for controlling said relay according to a predetermined code, a step-by-step-operated device for connecting said relay with any desired interrupter, and automatic means for rendering said relay inoperative for connecting said source with the line except when said interrupters are at the beginning of the code series.

45. In a telephone system, a party-line, a plurality of substations on said line, electrically controlled means under the control of the calling subscriber for signaling said stations according to a predetermined code, a machine common to the exchange for producing the code signals, and automatic means to insure that the code is always applied to the line at the beginning.

46. In a telephone system, a party line, a plurality of signals on said line, a source of ringing current, a relay for connecting said ringing current with the line, a plurality of interrupters for controlling said relay according to a predetermined code, and automatic means under the control of the calling subscriber for controlling said connection of the ringing current with the line.

47. In a telephone system, a party-line, a plurality of substations on said line, electrically controlled means under the control of the calling subscriber for automatically signaling said stations according to a predetermined code, and automatic means for rendering said signaling means inoperative except at the beginning of the code series.

48. In a telephone system, a party-line, a plurality of signals on said line at the substations, a source of ringing current, electrically controlled means under the control of the calling subscriber for connecting said ringing current with the line so as to operate said signals according to a predetermined code, and automatic means for rendering said connecting means inoperative except at the beginning of the code series.

49. In a telephone system, a party-line, a plurality of signals on said line, a source of ringing current, a relay for connecting said ringing current with the line, a plurality of interrupters for controlling said relay according to a predetermined code, electrically controlled means under the control of the calling subscriber for controlling said connection of the ringing current with the line, and automatic means for rendering the relay inoperative for connecting said ringing current with the line except when said interrupters are at the beginning of the code series.

50. In a telephone system, a party-line, a source of ringing current, a relay for connecting said source with said line, a plurality of interrupters for controlling the relay according to a predetermined code, a step-by-step-operated device under the control of the calling subscriber for connecting the relay with any desired interrupter, and automatic means for rendering said relay inoperative for connecting said ringing current with the line except when said interrupters are at the beginning of the code series.

51. In a telephone system, a party-line, a plurality of signals on said line, means including one or more automatic switches for extending a connection to said line, automatically-controlled means for operating said signals according to a predetermined code, and automatic means for rendering said operating means inoperative except at the beginning of the code series.

52. In a telephone system, a party-line, a plurality of signals on said line, means including one or more automatic switches for extending a connection to said line, a source of ringing current, means including a plurality of interrupters for connecting said source of current to the line so as to operate said signals according to a predetermined code, and automatic means for rendering said connecting means inoperative except at the beginning of the code series.

53. In a telephone system, a party-line, a plurality of signals on said line, means including one or more automatic switches for extending a connection to said lines, a source of ringing current, a relay for connecting said ringing current with the line, a plurality of interrupters for controlling said relay according to a predetermined code, and automatic means for rendering said relay inoperative for connecting said current with the line except when said interrupters are at the beginning of the code series.

54. In a telephone system, a party-line, means including one or more automatic switches for extending a connection to said line, a source of ringing current, a relay for connecting said source with said line, a plurality of interrupters for controlling said relay according to a predetermined code, a step-by-step-operated device for connecting said relay with any desired interrupter, and automatic means for rendering said relay inoperative for connecting said source with the line except when said interrupters are at the beginning of the code series.

55. In a telephone system, a party-line, a plurality of signals on said line, means including one or more automatic switches for extending a connection to said line, a source of ringing current, a relay for connecting said ringing current with the line, a plurality of interrupters for controlling said relay according to a predetermined code and automatic means under the control of the calling subscriber for controlling said connection of the ringing current with the line.

56. In a telephone system, a party-line, a plurality of substations on said line, means including one or more automatic switches for extending a connection to said line, means under the control of the calling subscriber for automatically signaling said stations according to a predetermined code, and automatic means for rendering said operating means inoperative except at the beginning of the code series.

57. In a telephone system, a party-line, a plurality of signals on said line at the substations, means including one or more automatic switches for extending a connection to said line, a source of ringing current, automatic means under the control of the calling subscriber for connecting said ringing current with the line so as to operate said signals according to a predetermined code, and automatic means for rendering said connecting means inoperative except at the beginning of the code series.

58. In a telephone system, a party-line, a plurality of signals on said line, means including one or more automatic switches for extending a connection to said line, a source of ringing current, a relay for connecting said ringing current with the line, a plurality of interrupters for controlling said relay according to a predetermined code, automatic means under the control of the calling subscriber for controlling said connection of the current with the line, and automatic means for rendering said relay inoperative for connecting said ringing current with the line except when said interrupters are at the beginning of the code series.

59. In a telephone system, a party-line, a source of ringing current, electrically controlled means for connecting said ringing current with said line, a plurality of interrupters adapted to control the application of said ringing current to the line according to predetermined codes, a step-by-step switch for selecting one of said interrupters, another interrupter, and circuit means controlled by said last-mentioned interrupter for preventing connecting of said ringing current with the line except when said first-mentioned interrupters are at the beginning of a code series.

60. In a telephone system, a trunk line, an automatic impulse transmitter adapted to be connected to said trunk, said transmitter including a rotating impulse wheel, and means for preventing said impulse transmitter from starting to send impulses over said trunk except when said wheel is in normal position.

Signed by me at Chicago, Cook county, Illinois, this 20th day of Febr. 1920.

TALBOT G. MARTIN.